United States Patent Office 3,150,491
Patented Sept. 29, 1964

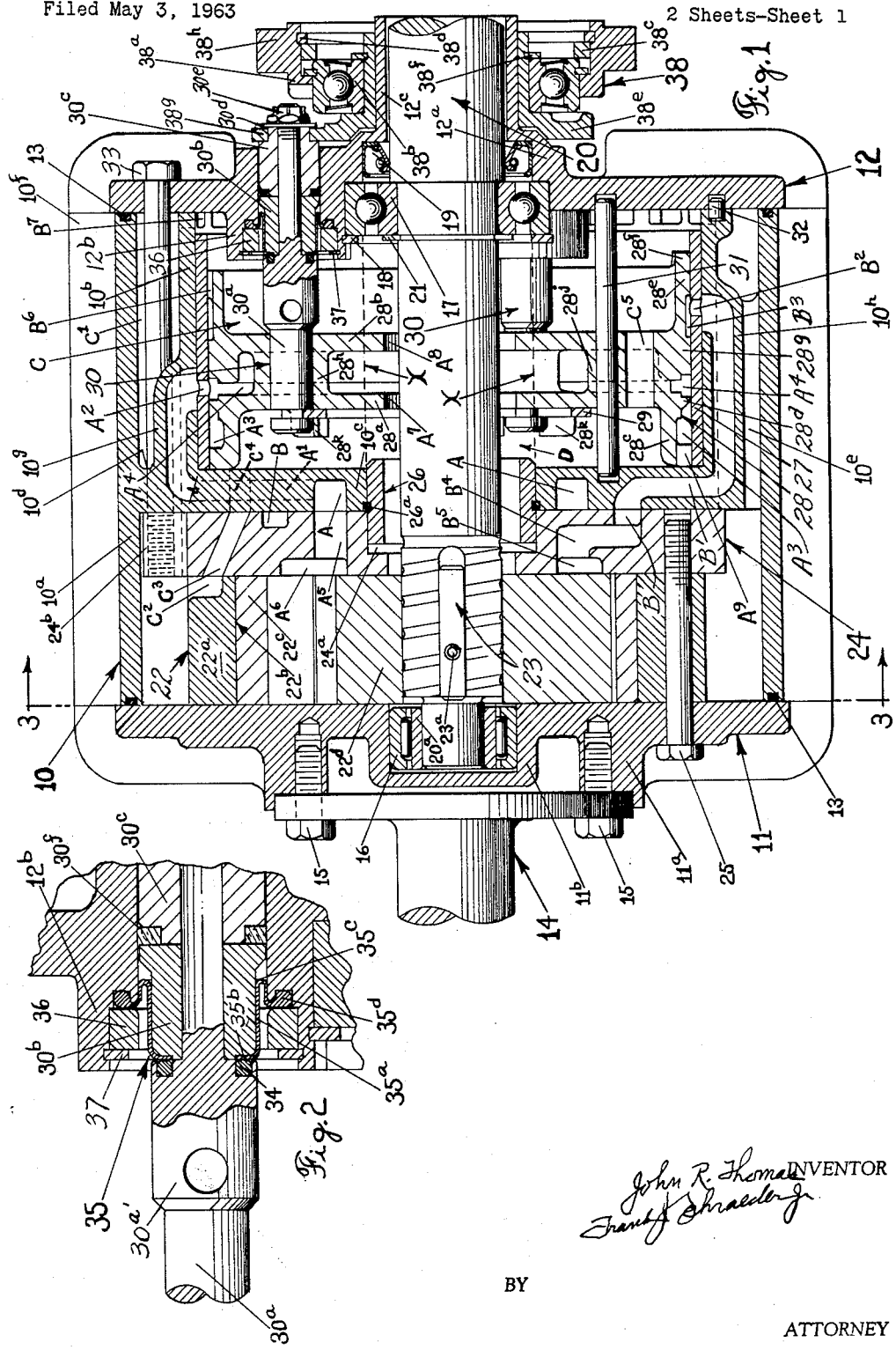

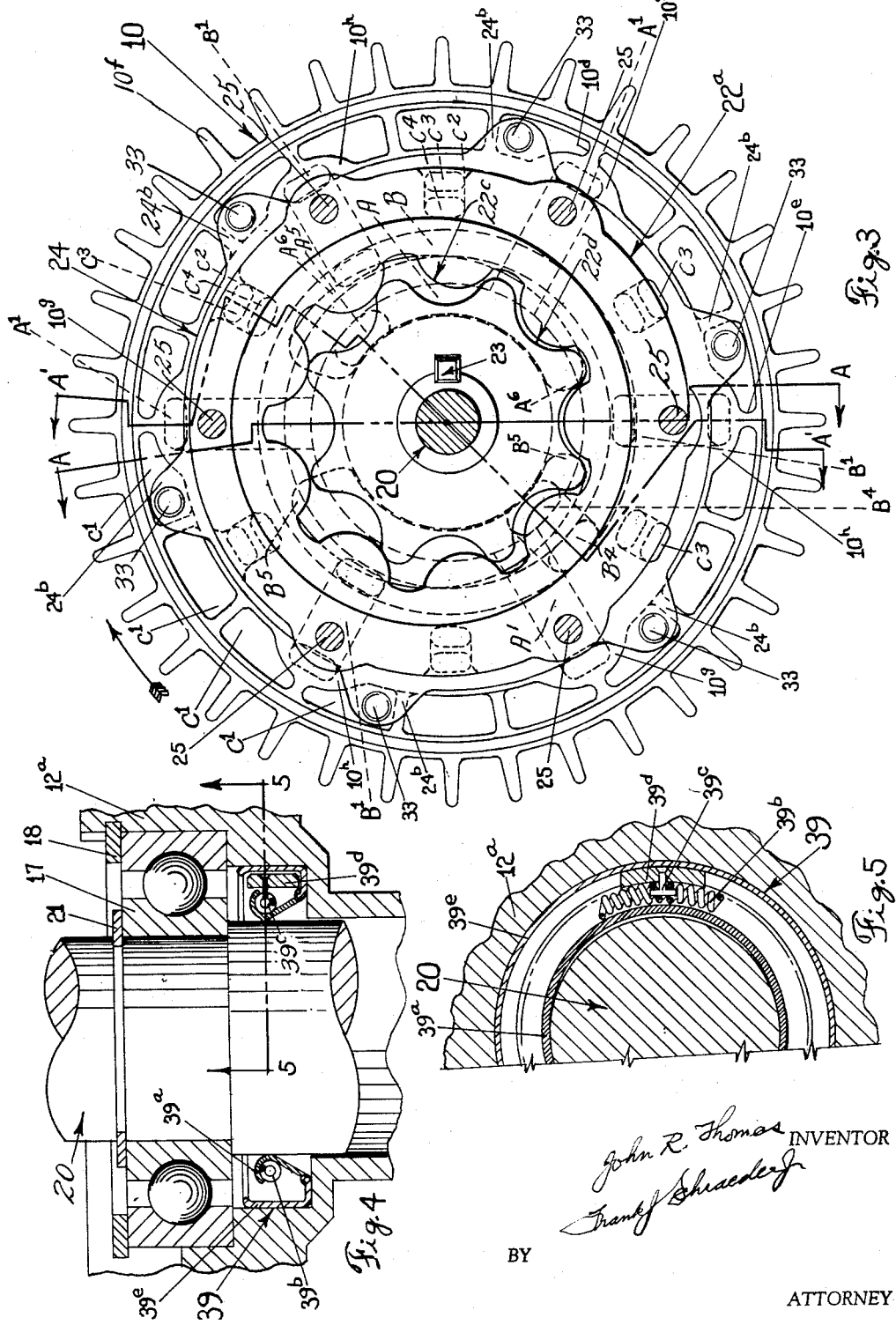

3,150,491
VARIABLE POWER TRANSMITTING HYDRAULIC APPARATUS
John R. Thomas, Wichita, Kans., assignor to The Thomas Company, Inc., Wichita, Kans., a corporation of Kansas
Filed May 3, 1963, Ser. No. 277,799
6 Claims. (Cl. 60—53)

This invention relates generally to improvements in variable power transmitting hydraulic apparatus adapted to be interposed between driving means and a driven member and wherein two fluids of different resistant value, such as for example air and oil, are employed independently as well as in mixtures of relatively varied proportions, and wherein the control of the pressure and flow of the independent fluids or their mixtures is effected through novel moveable valve means adapted for varying the pressure of metering and arresting the flow of the fluids through fluid-circulating power-transmitting pumping means such as, for example, a positive-displacement pump having elements operatively connecting the driving means with the driven member for transmitting selectively variable torque and speed to the driven member.

(1) One of the principal objects of my invention resides in the provision of absolute fluid retention means for exteriorly operable control means associated with moveable valve means whereby substantial frictional forces accompanying employment of slidable fluid retention means usually associated with the aforementioned exteriorly operable control means is eliminated, providing such an ease of actuation of the moveable valve means that adaptation of automatic or remote actuation means for the moveable valve means is enhanced as well as effecting a substantial reduction in costs of maintenance.

(2) Another object of my invention resides in the utilization of automatically alterable fluid retention means associated with exteriorly extending means for transmitting power to a driven member, such automatically alterable fluid retention means functioning substantially immediately after the beginning of input rotation imparted by the driving means, whereby the character of performance of said fluid retention means is altered to permit the passage of fluid through the fluid retention means to provide certain advantages hereinafter described.

(3) Still another object of my invention resides in the location of fluid flow circuits directly within the structural walls of the rotatable fluid reservoir whereby the fluids are placed in intimate contact with multiple cylindrical walls and conjoining internal fins of the fluid reservoir so as to provide maximum heat-transfer between the fluids and the reservoir.

(4) Another feature of the invention is found in the novel utilization, when adaptation or use criteria so require, of both ferrous and non-ferrous materials for enhanced heat-transmission and weight reduction benefits, and the directly associated usage of such ferrous and non-ferrous materials is of the nature wherein the coefficient of thermal expansion of either the ferrous or the non-ferrous is desirable, whereby the widely separated coefficients of the thermal expansion existing between ferrous and non-ferrous materials is practically negated by means hereinafter described.

The various features of novelty whereby the present invention is characterized will hereafter be pointed out with particularity in the appended claims; but, for a full undestanding of the invention and of its various objects and advantages, reference may be had to the following detailed description taken in connection with the accompanying drawings, wherein:

FIG. 1 is a composite longitudinal section, taken on line A—A of FIG. 3 for the input end plate 11, the pump body 22 and the gerotor pump members $22^c$ and $22^d$; the remaining parts being taken on line A'—A' of FIG. 3 through variable power-transmitting hydraulic apparatus exemplifying an embodiment of my invention;

FIG. 2 is an enlarged fragmentary section of one of the exteriorly extending reciprocable valve actuating rod assemblies as viewed in FIG. 1, a portion of the rod being broken away to show the positive static sealing attachment of one end of the fluid retention member to the rod, the other end of the fluid retention member having positive static sealing attachment to the reservoir end plate;

FIG. 3 is a cross-section taken on line 3—3 of FIG. 1 showing an end view of the positive-displacement pump and of the internal fin-supported double-cylindrical form of the fluid reservoir;

FIG. 4 is an enlarged fragmentary section of a modified form of the dynamic garter-spring type of fluid retention seal provided for the relatively rotating output shaft as viewed in FIG. 1; and FIG. 5 is a cross-section taken on line 5—5 of FIG. 4 showing the automatically altered fluid retention seal at its fully deflected position whereat air is permitted to flow past the raised lip of the seal in either direction.

In the disclosed example of my invention as illustrated in the drawings, the fluid reservoir, generally designated by the numeral 10, comprises an outer cylindrical wall $10^a$ and an inner cylindrical wall $10^b$ the inner end of which terminates at an integral axially centrally located radially inwardly extending flanged portion $10^c$. The cylindrical walls $10^a$ and $10^b$ are concentrically supported and connected one to the other by a series of internal fins $10^d$ and $10^e$. The outer cylindrical wall $10^a$ is preferably provided with external cooling fins $10^f$ and this wall extends from the flanged portion $10^c$ to conjoin with an input end plate 11, the opposite end of the outer cylindrical wall $10^a$ conjoining with a reservoir end plate 12. Each end portion of the outer cylindrical wall $10^a$ is provided with a static O ring seal 13 for fluid-tight mating of the fluid reservoir 10 with the end plates 11 and 12.

The input end plate 11 is provided with an outer hub portion $11^a$ which is recessed at its outer end for aligned mating with a flanged driving means such as, for example, a flanged power input shaft 14 by use of cap screws 15. The input end plate 11 is also provided with an inner hub portion $11^b$ which is fashioned to receive a pilot roller bearing 16.

The reservoir end plate 12 is provided with a central hub portion $12^a$ within which is mounted a ball bearing 17, removably retained therein by a retainer ring 18. The hub portion $12^a$ also has a suitable oil seal 19 mounted therein.

The power output shaft 20 extends inwardly through the fluid retention seal 19, is rotatably supported by the ball bearing 17 and is maintained in fixed axial relationship therewith by means of a retainer ring 21. The power output shaft 20 terminates in a reduced portion surrounded by an inner race $20^a$ which is rotatably supported by the pilot roller bearing 16.

The fluid-circulating power-transmitting pumping means may comprise any of the well known positive displacement pumps of the internal gear, spur gear, multiple spur gear, piston or vane types, however, an internal gear pump of the gerotor form well known for its advantages in simplicity and service life is shown, identified generally by the numeral 22. Referring to FIGS. 1 and 3, the pump consists of a circular pump body $22^a$ having an inner bore $22^b$ located eccentrically to the axis of the power output shaft 20 and contains an outer gerotor pump member $22^c$. An inner gerotor pump member $22^d$ having one less tooth than the outer gerotor member $22^c$ is located within the outer gerotor 22c, is slideably mounted on the power output shaft 20 and is operatively connected thereto by the key 23 which is retained at its axial location by a lock-pin 23a. The gerotor pump members 22c and 22d co-act one with the other in pumping action well known to those skilled in the art when the apparatus is in operation as hereafter described.

The input end plate 11 and a manifold plate 24 form side plates for the pump 22, being aligned and securely fastened to the pump body 22a by the cap screws 25.

The manifold plate 24 has a centrally located bore 24a within which is mounted a tubular co-axial dowel 26 for aligned association with the central bore of the fluid reservoir's flanged portion 10c which, together with the co-axial dowel 26 is recessed to provide space for a dowel retaining ring 26a.

The inner cylindrical wall portion 10b of the fluid reservoir 10 contains a cylindrical valve seat 27 which is retained at its assembled position by interference-fit relation with the inner cylindrical wall portion 10b. The valve seat 27 is provided with a plurality of circumferentially spaced fluid suction ports $A^2$ which are axially spaced from a plurality of circumferentially spaced fluid discharge ports $B^2$, both of which will be described with specificity in association with other fluid flow circuits, zones, ports and passages hereinafter referred to and which, to more clearly set forth an understanding of same, will be designated by capital letters together with numeral suffixes to identify those portions thereof which have typical or identical functional character.

As shown in FIG. 1, I provide single fluid suction and discharge controlling moveable valve means consisting of a unitary cylindrical valve structure, generally designated by the numeral 28, which is axially slidably mounted within the valve seat 27. The valve structure 28 comprises two diametrically disposed axially spaced circular walls 28a and 28b.

The circular wall 28a extends radially outwardly from a central opening $A^7$ and terminates in an axially widened peripherally disposed circular rim portion 28c which includes an oil inlet channel $A^3$ having a plurality of circularly spaced arcuate openings $A^9$ extending axially transversely through the end wall of the rim portion 28c. It will be noted that these arcuate openings $A^9$ which provide oil inlets to the channel $A^3$ are directly adjacent to the inner peripheral surface of the valve seat 27 and that the inner boundary of the oil inlet channel $A^3$ comprises a preferably narrow circular outer face 28d which forms a fluid suction control rim for the valve structure.

The circular wall 28b extends radially outwardly from a central opening $A^8$ and terminates in an axially widened peripherally disposed circular rim portion 28e having at its outer extremity a plurality of valve-stop lugs 28f. The circular rim portion 28e includes a fluid discharge channel $B^3$ having a plurality of circularly spaced arcuate fluid discharge passages $B^6$ extending axially transversely through the end wall of the rim 28e, so as to cause the flow of all fluid discharge to be directed directly toward a plurality of circularly spaced slots $B^7$ provided in the outer end of the inner cylindrical wall 10b to permit fluid flow into the intercylindrical passages $C^1$. The rim 28e extends axially inwardly from the circular wall 28b to form a fluid discharge control rim 28g for the valve structure.

The circular walls 28a and 28b are joined together by preferably three equally circularly spaced bosses 28h through which extend a portion of the valve actuating rod assemblies generally designated by the numeral 30, to be operatively secured to the valve 28 by the retaining ring 29. The retaining ring 29 is held to the valve 28 by the pads 28k which are integrally fromed with the valve wall 28a and which are undercut to receive the retaining ring 29. The ring 29 extends into radially aligned registering grooves in the ends of the valve actuating rod assemblies 30.

A plurality of intermediate bosses 28j also join the walls 28a and 28b and each of these intermediate bosses 28j is formed with fluid transfer passages $C^5$ extending axially of the valve and transversely through the circular walls 28a and 28b to afford free axial flow of fluid therethrough. One of the joining bosses 28j has a radially inwardly extended wall so as to encompass a valve guide 31. The ends of the valve guide 31 are positioned within a recess provided in the fluid reservoir wall 10c and in the reservoir end plate 12 and this valve guide 31 insures unitary rotation of the valve 28 with the valve seat 27 during its relative axial movement therein. It will be noted that the valve walls 28a and 28b enclose a radial air passage $A^4$ within the valve, said air passage $A^4$ being independent of the bosses 28h, 28j and the fluid transfer passages $C^5$.

The reservoir end plate 12 is maintained in fixed concentrically radial relationship with the fluid reservoir by a plurality of dowels 32 and is securely fastened to the reservoir 10 by a plurality of circularly spaced cap screws 33 which pass through a series of the intercylinder passages $C^1$ to engage threads provided within the extension lugs 24a of the manifold 24. The end plate 12 is provided with axially extended wall portions 12b designed to accommodate certain operatively associated parts of the valve actuating rod assemblies 30 and which will be covered later.

The exteriorly operable control means is operatively connected with the valve 28 by the valve actuating rod assemblies 30, each of which comprises a valve rod 30a the inner end of which is axially retained to the valve 28 as heretofore described. The outer end of an enlarged central portion 30a′ has a radially inwardly extending face which is provided with a circular recess to accommodate a static O ring seal 34. A reduced diameter portion of the valve rod 30a extends outwardly through the central bore of a piston 30b the inner end of which has a slightly inwardly extending central portion abutting against the face of the central portion 30a′ immediately radially inwardly of the circular recess containing the seal 34. The inner peripheral end of the piston 30b is provided with a rounded corner blending with an axially extended reduced diameter portion upon which is supported the cylindrical portion of a cup-shaped absolute fluid-retaining diaphragm type of dynamic seal generally designated by the numeral 35. The outer end of the piston 30b is of increased diameter sized for suitable sliding fit within the central bore of the end plate wall portions 12b.

The diaphragm seal 35 comprises a cylindrical portion 35a, a radially inwardly flanged end portion 35b, a convoluted portion 35c and a radially outwardly flanged portion circumferentially terminating as an O ring static seal portion 35d. The diaphragm seal 35 is preferably constructed with a particular kind of mesh fabric combined with an impregnating overlay of a suitable resilient fluid-retaining elastomer and molded in an appropriate configuration to operate in a manner to be hereafter described.

The inwardly extending portions 12b of the end plate 12 are provided with a counterbore containing a circular recess properly fashioned in the face outwardly adjacent thereto to receive the static seal portion 35d of the diaphragm seal 35. An adjacent but slightly enlarged counterbore provides mounting space for a hollow, circular spacer ring 36 which is held in fixed position therein by a retainer ring 37 placed in an undercut provided within the enlarged counterbore so as to maintain a designed amount of diametral compression for the static seal portion 35d to effect positive fluid damming association for the static seal portion 35d with the wall portion 12b.

The reduced diameter portion of the valve rod 30a also extends outwardly through the central bore of a spacing bushing 30c and a washer 30d, its outer end portion being threaded to receive a self-locking type of nut 30e. The spacing bushing 30c has a reduced diameter portion at its inner end about which is supported a circularly formed felt seal 30f.

It will be noted that the central hub portion 12a of the reservoir end plate 12 has an outwardly extending tubular portion 12c which surrounds the output shaft 20 but having operating clearance therewith.

The exteriorly operable control means consists of a shifter assembly generally designated by the numeral 38 and which is axially slidably mounted on the tubular portion 12c. The shifter assembly 38 includes a cylindrically shaped housing 38a bored to receive a snap-ring type ball bearing 38b the outer race of which is retained within the housing 38a by means of a bowed spacer ring 38c and a retainer ring 38d. The shifter assembly 38 also includes a cylindrically shaped shifter sleeve 38e slidably mounted on the tubular portion 12c of the end plate 12 and fashioned to receive the inner race of the ball bearing 38d which is held in axially fixed location on the shifter sleeve 38e by the retained ring 38f. The shifter sleeve 38e is provided with three integral radially extending lugs 38g.

Referring to FIG. 1, it will be seen that the spacing bushing 30c has a diametrically reduced outer end portion which extends through a bore provided in the lugs 38g, such extension of the bushing 30c being slightly greater than the thickness of the lugs 38g so that the push-pull axial movement of the shifter assembly 38 is freely transferred to the valve rod assemblies 30 without inadvertent mechanical bind.

Referring to FIGS. 1 and 2, it will be noted that the inwardly flanged portion 35b of the dynamic diaphragm seal 35 is securely clamped against the static O ring seal 34 which is diametrically compressed a desired amount, as provided by the abutment of the slightly extended end portion of the piston 30b against the face of the valve rod portion 38a′, when the nut 30e has been tightened, the O ring seal 34 effecting a positive fluid damming association of the diaphragm seal's flanged portion 35b with the valve rod 30a.

With the heretofore described construction of the diaphragm seal 35 in mind and referring to FIG. 2, it will be further understood that the diaphragm seal's cylindrical portion 35a forms an absolute and flexible fluid retaining wall which continuously extends from its statically sealed end portion 35b to its statically sealed end portion 35d during the entire outward movement of the valve 28 and the valve rod assemblies 30 from their position shown in FIG. 1 to a position whereat the valve-stop lugs 28f engage the inner face of the reservoir end plate 12, and during which movement the seal's cylindrical portion 35a progressively rolls off the supporting surface of the piston 30b and rolls progressively onto the supporting surface of the central bore provided within the wall portion 12b of the end plate 12 through means of the seal's convoluted portion 35c.

The shifter housing 38a is provided with two oppositely disposed trunnions 38h which are adapted for continuous engagement by the forked end of a pivoted valve-controlling shifter fork not shown but well known in the art.

The fluid-tight compartment formed by the fluid reservoir 10 together with the end plates 11 and 12 is partially filled with oil which, during rotation of the apparatus, assumes annulus form in a zone which, for illustration is designated by the letter C and which is defined by the broken lines designated by X in FIG. 1. The oil annulus zone C surrounds a central core of air which zone is, for illustration, designated by the letter D.

The fluid reservoir's flanged portion 10c is provided with a radially disposed circular recessed suction passage A which connects the radially inner ends of a plurality of radially disposed suction passages A¹ formed within the flanged portion 10c and these passages A¹ then extend laterally outwardly as within the confining walls 10g to emerge at the inner surface of the fluid reservoir's inner cylindrical wall 10b to register with the suction ports A² of the valve seat 27.

The fluid reservoir's flanged portion 10c is also provided with a plurality of fluid discharge passages B¹ radially disposed therein and which extend further laterally outwardly within the confining walls 10h to emerge at the inner surface of the fluid reservoir's inner cylindrical wall 10b to register with the discharge ports B² of the valve seat 27.

As indicated with broken lines in FIGS. 1 and 2, the fluid reservoir's flanged portion 10c is provided with a plurality of circularly elongated horizontally disposed fluid transfer passages C⁴ to permit the flow of fluids therethrough.

Again referring to FIGS. 1 and 2, the manifold plate 24 is shown to include a circularly elongated passage A⁵ aligning with the fluid reservoir's circular passage A and communicating with a recessed suction trap-relief area A⁶ disposed in the manifold plate surface adjacent the gerotor pump members 22c and 22d. The manifold plate 25 includes a circular recessed discharge passage B which aligns with the radially inner ends of the fluid reservoir's discharge passage B¹ and this passage B has a connecting passage B⁴ which is radially disposed within the wall of the manifold plate 24 and then horizontally extended to connect with a recessed discharge trap-relief area B⁵ disposed in the manifold plate surface adjacent the gerotor pump members 22c and 22d. The manifold plate 24 also includes a plurality of angularly horizontal, circularly elongated fluid transfer passages C³ which connect the fluid reservoir's transfer passages C⁴ with recessed fluid transfer passages C² provided in the face of the pump body 22a adjacent the manifold plate 24.

The valve 28 is provided, in addition to its fluid flow facilities A³, A⁷, A⁸, A⁹, B³, B⁶ and C⁵ heretofore described, with an air suction passage A⁴ which is radially disposed between, and defined by, the valve walls 28a and 28b.

In the modified form of the dynamic garter-spring type of fluid-retaining output shaft seal illustrated in FIGS. 4 and 5 and generally designated by the numeral 39, the shaft-sealing lip 39a is shown to be radially circularly extended from the form as shown by numeral 19, FIG. 1, to a point approaching the diametrically outward point on the garter spring 39b so as to partially encompass the garter spring 39b. The spring 39b is threaded onto the cross-bar of a T-shaped member 39c. The leg of the member 39c extends radially outward through the spring 39b and is shown to pass through and is riveted to a circularly formed actuating bar 39d.

FIG. 4 illustrates the normal fluid retaining position of the seal lip 39a for input non-rotation or relatively slowly rotating conditions of operation of the apparatus, whereby the designed compressive force of the spring 39b is such that the seal lip 39a has adequate fluid-retaining contact with the total circumferential surface of the output shaft 20. It will be noted that the thickness of the actuating bar 39d in association with the length of the leg of the member 39c is such that some space exists between the actuating bar 39d and the seal housing 39e. Various garter-spring force and actuating bar weight combinations may be employed to accomplish the desired results but for the purpose of illustration, the compressive force of the spring 39b in relation to the centrifugal force to be exerted by the weight of the actuating bar 39d is such that its centrifugal force exceeds the compressive force of the spring 39b when the input speed of the apparatus exceeds approximately 250 revolutions per minute.

FIG. 5 illustrates the automatically altered position of the actuating bar 39d wherein it is shown held against the seal housing 39e by its centrifugal force being greater than the compressive force of the spring 39b during input speeds of the apparatus exceeding, for example, 250 revolutions per minute, whereby a portion of the seal lip 39ª, through its encompassing association with the spring 39ᵇ, has been radially outwardly deflected from the output shaft 20 by the spring-weight connecting member 39ᶜ. It will be noted that the deflected portion of the seal lip 39ª now assumes an elliptical form and avoids contact with the output shaft 20, permitting unhampered passage of air into or out of the apparatus. The seal lip 39ª will again assume normal fluid-retaining contact with the output shaft 20 when the input speed of the apparatus decreases to or falls below approximately 250 revolutions per minute.

In my improved variable power-transmitting hydraulic apparatus disclosed herein wherein the control of the independent fluids, such as air and oil, or of relatively varied proportions thereof in desired operative mixtures is selectively effected through the novel valve, the operation of the apparatus and the functions of the valve will become readily understood from the following description of the operation which for this purpose is based on the assumption that the fluid reservoir 10, the end plates 11 and 12 and the input shaft 14 are, due to their above described rigid operative interconnection, rotating as a unit clockwise as indicated by the arrow in FIG. 3.

As shown in FIG. 1, the valve 28 is at its extreme inward position which is the neutral position. Only air from the central air zone D is being admitted through the valve wall openings $A^7$ and $A^8$ into the radial passage $A^4$ which is in registration with the valve seat ports $A^2$, the flow of air continuing through the fluid reservoir's passages $A^1$ and A, through the manifold's suction passage $A^5$ to enter the suction trap-relief area $A^6$ of the manifold 24 from which the air is carried around by the co-acting gerotor members $22^c$ and $22^d$ of the pump 22 for positive displacement by the pump 22 into the discharge trap-relief area $B^5$ from whence the air flows into and through the discharge passage $B^4$ of the manifold 24 and into its circular channel B to be distributed into the passages $B^1$ of the fluid reservoir for discharge through the valve seat ports $B^2$. The air then flows into the channel $B^3$ of the valve rim $28^e$ from which it flows through the passages $B^6$ to again assume its annular form in the central zone D. Under such neutral operation wherewith only air is being circulated through the pump 22, the output shaft 20 for all practical purposes is in inoperative or stationary position.

When the valve 28 is moved outward, or to the right from the position shown in FIG. 1, the valve's narrow fluid suction control rim $28^d$ passes progressively across the valve seat's suction ports $A^2$ permitting oil from the oil channel $A^3$ of the valve rim $28^c$, and which is being replenished through its openings $A^9$, to enter the suction ports $A^2$ in a progressively increased amount while the air from the valve's radial passage $A^4$ enters the suction ports $A^2$ in a progressively decreased amount until only oil is entering the suction circuit. Initially the air and oil admixtures, and finally only oil, as the circulating medium, thus enters the valve seat ports $A^2$ to flow through passages $A^1$, A, $A^5$ and into the suction trap-relief area $A^6$ to be positively displaced by the pump 22, entering the discharge trap-relief area $B^5$. The circulating medium is then pumped through the passage $B^4$ of the manifold plate 24 for distribution by the channel B into the fluid reservoir's passages $B^1$ to discharge through the valve seat ports $B^2$, entering the channel $B^3$ of the valve rim $28^e$ for axially outward flow therefrom through the passages $B^6$.

Substantially all of the circulating medium emerging from the valve rim passages $B^6$ is centrifugally forced through the openings $B^7$ of the fluid reservoir 10 to flow horizontally the full length of the fluid reservoir's intercylinder passages $C^1$ to surround the pump 22 and to flow by the pump body recesses $C^2$, through the manifold plate's passages $C^3$ and the fluid reservoir's passages $C^4$ to again enter the respective annular zones C or D.

It should now be pointed out that the valve's fluid suction control rim $28^d$ moves substantially past the outward edges of the valve seat's suction ports $A^2$ prior to the valve's fluid discharge control rim $28^g$ progressive closing of the valve seat's discharge ports $B^2$ during movement of the valve 28 toward its fully engaged position whereat the valve-stop lugs $28^f$ will abut the inner face of the reservoir end plate 12.

When the valve 28 is moved fully outwardly to its fully engaged position as above described, its discharge control rim $28^g$ completely closes all of the discharge ports $B^2$, and the flow of oil from the pump 22 is entirely arrested and the arrested oil flow prevents any further substantial relatively rotating co-action of the pump elements $22^c$ and $22^d$, consequently the output shaft 20 is caused to rotate practically in unison with the input shaft 14.

It will thus be understood that a full range control of the torque and speed is delivered by the output shaft 20 simply by the axial movement of the valve 28 relatively to the valve seat 27. It will be further understood that the precise number, size and location of the valve seat's suction ports $A^2$ as well as the number, size and location of its discharge ports $B^2$ relative the width and associated location of the valve's control rims $28^d$ and $28^g$ may be varied by those skilled in the art so as to provide the functional character desired to the accomplished by the axial movement of the valve 28 relative to the valve seat 27 without departing from the spirit of my invention.

Through use of the novel diaphragm seal 35 for each of the valve rod assemblies 30, it will be apparent that practically effortless axial movement of the valve 28 through actuation of the external shifter assembly 38 is accomplished.

Where precise remote or automatic control means, for example, are desired to be incorporated with the herein-disclosed apparatus to actuate its shifter assembly 38 and the valve 28, employment of the novel internal pressure-atmospheric pressure equalizing facility exemplified by the modified form of dynamic oil seal 39 illustrated in FIGS. 4 and 5 provides an effective and simple means to eliminate unbalanced axial forces, however slight, being exerted on the valve rod assemblies 30 by the diaphragm seals 35 and resulting from apparatus-operating conditions wherewith the interiorly contained annular zones C and D have a temperature-created pressure other than that of the atmosphere.

It will be readily apparent from the preceding description of the flow of the fluids that the flow of substantially all of the oil circulated by the pump 22 through the heretofore described passages results in a substantial increase in contact of the oil with metal surfaces of the fluid reservoir's passages $A^1$ and $B^1$, its cylindrical walls $10^a$ and $10^b$ with their connecting internal fins $10^d$ and $10^e$ to provide for the transfer of heat from the oil to these metal surfaces to be carried through the metal to the fluid reservoir's external fins and to any external fins which may be provided for the end plates 11 and 12.

To further improve the heat transmission capacity of the apparatus or to accomplish a substantial weight reduction for the apparatus, where either or both of these or other premises apply, the reservoir 10, the reservoir end plate 12 and the valve 28 for example, may be constructed of a non-ferrous material such as aluminum. Functional requirements, however, usually necessitate the use of a ferrous material such as, for example, steel for the relatively thin-walled valve seat 27.

I have found that the widely diverged coefficients of thermal expansion which characterize aluminum and steel precludes the use of usual operating sliding-fit clearances for a steel valve seat 27 and an aluminum valve 28, which usual clearances provide the degree of performance and efficiency normally expected for the apparatus. The applicaton of excessive operating sliding-fit clearances which are sufficient to prevent the aluminum valve 28 with its higher expansion rate, from becoming inoperatively tight within the confines of the steel valve seat 27, result in a sub-normal degree of performance and efficiency for the apparatus.

To overcome the above-described impairments and still retain the advantages gained through the associated use of ferrous and non-ferrous materials, I have found that a relatively large diametral interference fit can be provided for the steel valve seat 27 in its permanent assembly with the aluminum fluid reservoir 10, the selected associated interference fit being such that the yield strength of the fluid reservoir structure is not exceeded when the valve seat 27 and the fluid reservoir 10 are at the lowest normally expected environmental temperature.

I have found that the application of such interference fit principles to the steel valve seat 27 within the aluminum fluid reservoir 10 results in a sufficiently unified rate of thermal expansion for both the thin-walled steel valve seat 27 and its enclosing aluminum fluid reservoir 10 to permit employment of operating sliding-fit clearances between an aluminum valve 28 and the steel valve seat 27 which could ordinarily be employed when only non-ferrous or ferrous material are used for both the valve 28 and the valve seat 27, thus providing the degree of performance and efficiency normally expected for the apparatus.

One method of fabrication for the steel valve seat 27 and the aluminum fluid reservoir 10 to obtain the associated interference fit herein described, consists of providing an inside diameter for the valve seat-receiving bore of the fluid reservoir of 10 small enough, relatively to the outside diameter of the steel valve seat 27 to establish a desired minimum interference fit between these two permanent parts when the apparatus is operating at its maximum recommended temperature, for example 250° F. The aluminum fluid reservoir 10 is then separately heated to approximately 400° F. and the steel valve seat 27 is separately cooled to approximately minus 20° F. The two parts can then be readily assembled together since the wide divergence of the coefficients of thermal expansion for steel and aluminum as well as wide separation of temperatures provided for the two parts prior to their assembly presents ample momentary assembly clearance therebetween.

It will be understood by those skilled in the art to which my invention relates that the details of construction of the various parts and their arrangements, shown in the drawings for illustrative purposes, may be modified and rearranged within the scope of the appended claims without departing from the spirit of the invention.

I claim:

1. Variable power transmitting hydraulic apparatus operatively employing two fluids of different resistant value and comprising: a rotatable reservoir partially filled with oil and connected to power driving means, a rotatable fluid-circulating power-transmitting pump, an output shaft operatively connected with said pump, fluid flow control valve means within said reservoir, fluid suction and discharge passages operatively associated with said pump and with said fluid flow control valve means, exteriorly operable control means operatively associated with said fluid flow control valve means and operatively connected with said rotatable reservoir, said reservoir-connected exteriorly operable control means including resilient fluid-retaining means having portions thereof in positive fluid-tight connection with said exteriorly operable control means and with said rotatable reservoir to thereby provide absolute retention of fluids within said reservoir notwithstanding movement of said exteriorly operable control means relatively to said reservoir.

2. Variable power transmitting hydraulic apparatus operatively employing two fluids of different resistant value and comprising: a rotatable reservoir partially filled with oil so as to provide an outer annular zone of oil and an inner central zone of air and connected to power driving means, a rotatable fluid-circulating power-transmitting pump, an output shaft operatively connected with said pump, fluid flow control valve means within said reservoir, fluid suction and discharge passages operatively associated with said pump and with said fluid flow control valve means, exteriorly operable control means operatively associated with said fluid flow control valve means and operatively connected with said rotatable reservoir, said exteriorly operable control means including resilient fluid-retaining means having one portion thereof joined in fluid-tight affinity with said exteriorly operable control means and having another portion thereof joined in fluid-tight affinity with said reservoir to thereby provide absolute retention of fluids within said reservoir notwithstanding axial movement of said exteriorly operable control means relatively to said reservoir.

3. Variable power transmitting hydraulic apparatus operatively employing two fluids of different resistant value and comprising: a rotatable reservoir partially filled with oil so as to provide an outer annular zone of oil and an inner central zone of air and connected to power driving means, a rotatable fluid-circulating power-transmitting pump, an output shaft operatively connected with said pump, a fluid-retaining sealing means interposed between said rotatable reservoir and said output shaft, said sealing means including a sealing member having spring-pressed fluid-retaining contact with said output shaft during stationary positions of said hydraulic apparatus and during rotations of said hydraulic apparatus below a pre-determined rotating speed, said spring-pressed contact of said sealing member with said output shaft being automatically altered by centrifugal force means disposed within said sealing means during rotation of said hydraulic apparatus above a pre-determined rotating speed whereby a portion of said sealing member is restrained from having fluid-retaining contact with said output shaft to thereby provide a fluid passage between said inner zone of air and the exterior atmosphere.

4. Variable power transmitting hydraulic apparatus operatively employing two fluids of different resistant value and comprising: a rotatable reservoir partially filled with oil and providing an outer annular zone of oil and an inner zone of air and connected with power driving means, a rotatable fluid-circulating power-transmitting pump, an output shaft operatively connected with said pump, a fluid-retaining sealing means interposed between said rotatable reservoir and said output shaft, said sealing means including a sealing member having fluid-retaining circumferential contact with said output shaft during stationary positions of said hydraulic apparatus and during rotations of said hydraulic apparatus below a predetermined rotating speed, said circumferential contact being automatically altered by centrifugal force-actuated means disposed within said sealing means during rotation of said hydraulic apparatus above a predetermined rotating speed whereby a portion of said sealing member is restrained from having circumferential contact with said output shaft to thereby provide a fluid-flow passage between said inner zone of air and the exterior atmosphere.

5. Variable power transmitting hydraulic apparatus comprising a rotatable reservoir containing an outer annular zone of oil and an inner zone of air, a rotatable fluid-circulating power-transmitting pump, an output shaft operatively connected with said pump, fluid flow control valve means within said reservoir, suction and discharge fluid passages operatively associated with said pump and with said fluid flow control valve means, said rotatable reservoir including a fluid-encompassing outer cylindrical wall, a valve seat-supporting inner cylindrical wall, a plurality of internal fins joining said outer cylindrical wall to said inner cylindrical wall, said suction and discharge fluid passages being disposed between said outer cylindrical wall and said inner cylindrical wall and integrally formed with said cylindrical walls and certain internal fins to provide increased heat transfer from said suction and discharge fluid passages to said outer cylindrical wall for heat dissipation therefrom.

6. Variable power transmitting hydraulic apparatus as set forth in claim 5 wherein said fluid-encompassing outer cylindrical wall, said valve seat-supporting inner cylindrical wall and said fluid flow control valve means are composed of non-ferrous material having an inherent relatively high coefficient of thermal expansion, and wherein said valve seat is composed of ferrous material having an inherent relatively low coefficient of thermal expansion; an interference being provided in the associated assembled fit of the ferrous valve seat within its peripherally supporting non-ferrous inner cylindrical wall such as to establish a relatively unified rate of thermal expansion for said rotatable reservoir and said valve seat and said fluid flow control valve means, whereby the sliding fit clearance between said non-ferrous fluid flow control valve means and said ferrous valve seat is substantially reduced.

References Cited in the file of this patent
UNITED STATES PATENTS

| | | |
|---|---|---|
| 2,658,343 | McGill | Nov. 10, 1953 |
| 3,098,358 | Paschke | July 23, 1963 |